April 18, 1933. E. H. REEVES 1,904,031
VEHICLE BODY
Filed Nov. 18, 1929 2 Sheets-Sheet 1
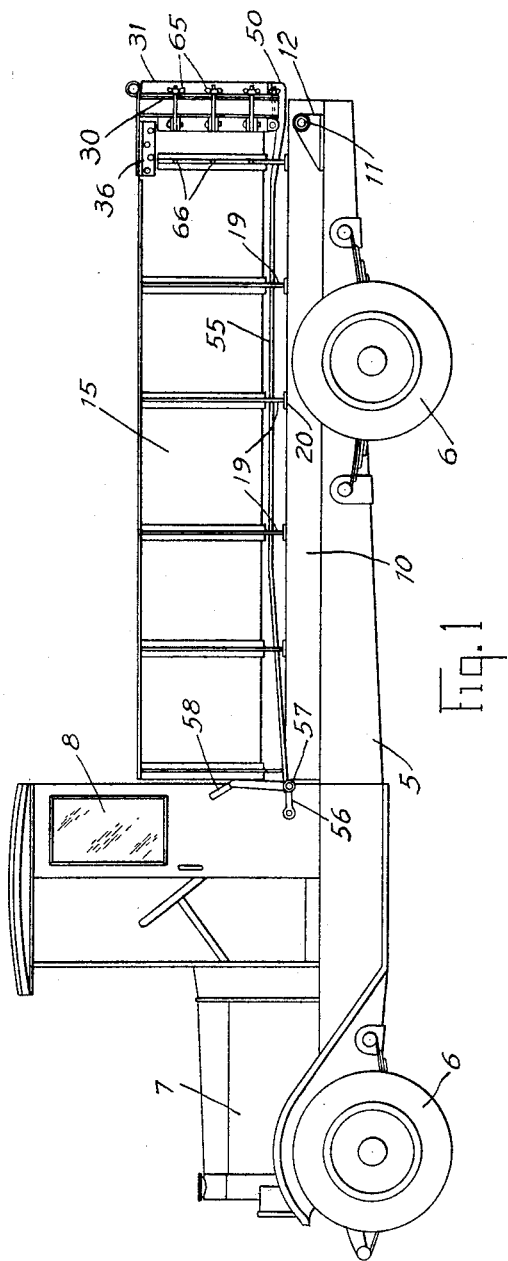
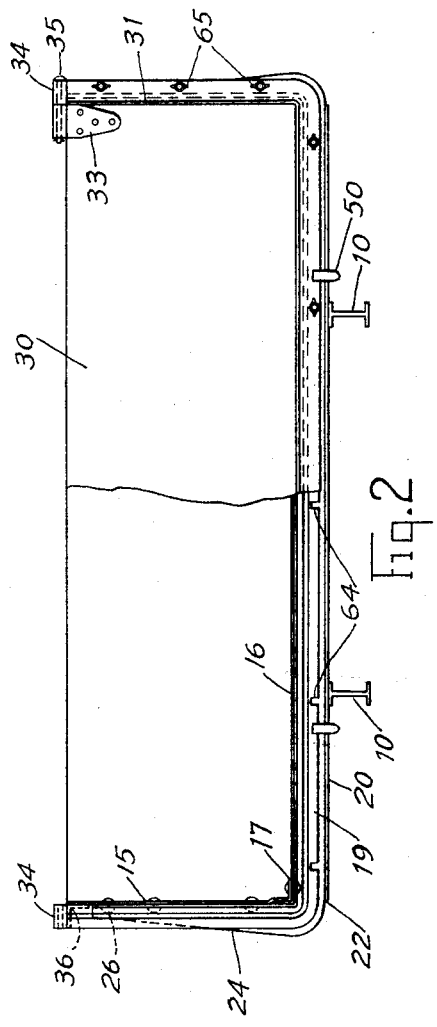
Inventor
Elwin H. Reeves
By Braselton, Whitcomb Davies
Attorney April 18, 1933.　　　　E. H. REEVES　　　　1,904,031
VEHICLE BODY
Filed Nov. 18, 1929　　　　2 Sheets-Sheet 2
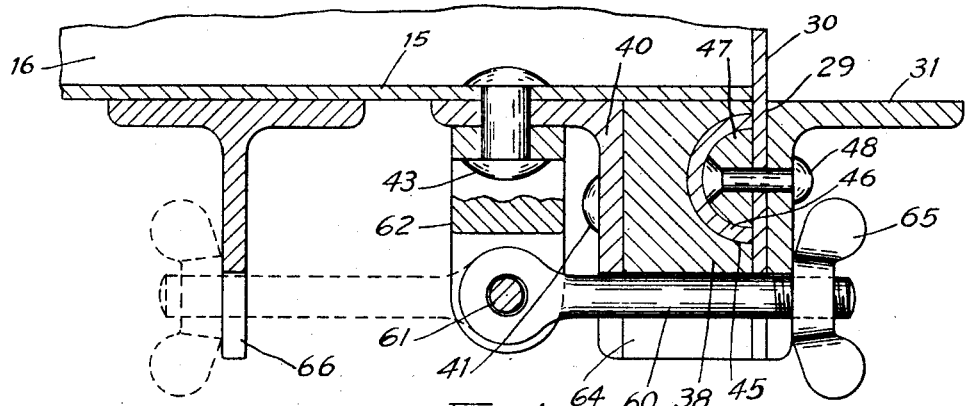
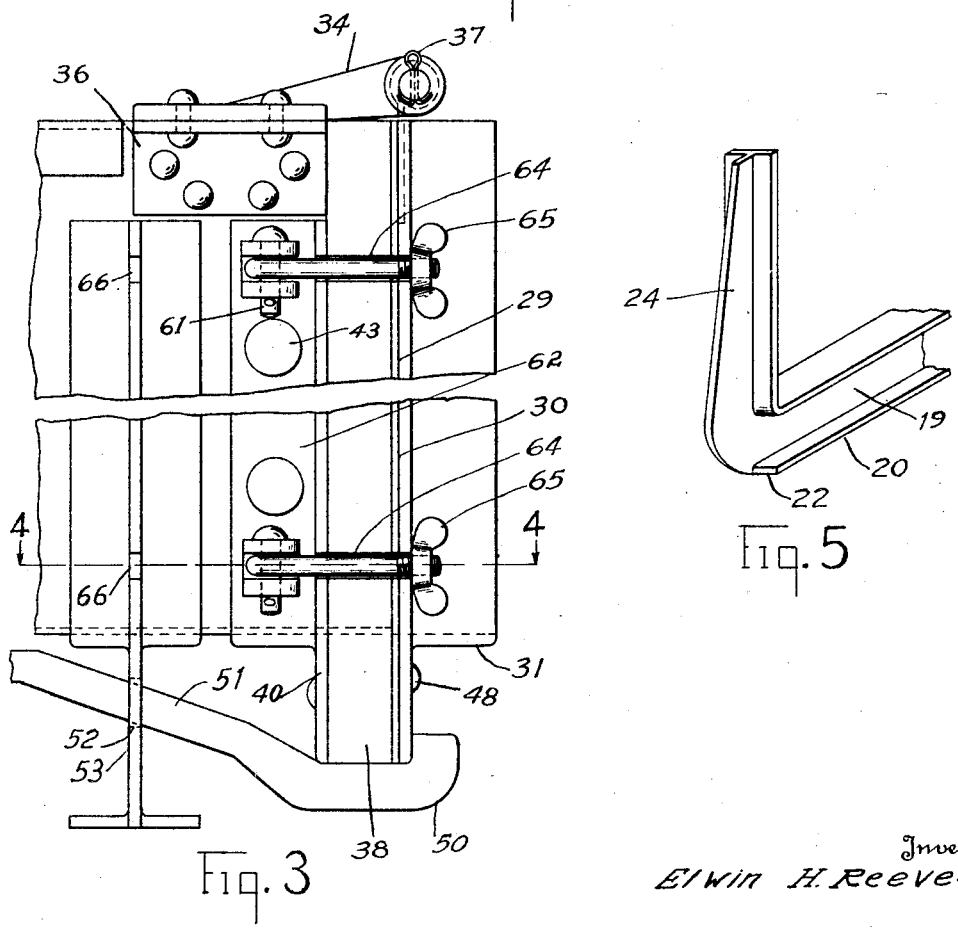
Inventor
Elwin H. Reeves
By Braselton, Whitcomb Davies
Attorney Patented Apr. 18, 1933

1,904,031

UNITED STATES PATENT OFFICE

ELWIN H. REEVES, OF TOLEDO, OHIO

VEHICLE BODY

Application filed November 18, 1929. Serial No. 407,998.

This invention relates to vehicle bodies and more particularly to the construction of those types of bodies utilized or employed in transporting comparatively large quantities of inert material.

The invention has for an object the provision of a novel and simple end gate or closure construction for truck bodies and an effective and simple sealing means therefor.

One phase of the invention is directed to an effective sealing means for a vehicle end gate construction, the same being so arranged as not to be subjected to the abrasive or deleterious action of the materials transported during the loading or unloading operations.

The invention also embraces the provision of a vehicle body of this character which may be readily utilized for transporting solids, for example, brick, stone, slate, et cetera, and also for transporting semi-solids or liquids as, for example, plaster, garbage and the like.

Another object is the provision of a vehicle body of this character incorporating dual means for securing the end gate in closed position, these securing means being so arranged that either or both may be utilized as desired.

Another object is the provision of retaining means for the vehicle end gate construction which may be readily adjusted from a retaining position to a position out of use.

Another object is to provide a novel and simplified construction for a vehicle body and particularly the skeleton supporting frame therefor.

Further objects and advantages are within the scope of this invention such as relate to the arangement, operation and function of the related elements of the structure, to various details of construction and to combinations of parts, elements per se, and to economies of manufacture and numerous other features as will be apparent from a consideration of the specification and drawings of a form of the invention which may be preferred, in which Figure 1 is a side elevational view of a combined truck and body construction incorporating my invention;

Figure 2 is an end view of the vehicle body of my invention, a part of the end gate being shown broken away;

Figure 3 is an enlarged fragmentary view of a portion of the vehicle body showing the end gate construction and the dual securing means therefor;

Figure 4 is an enlarged fragmentary sectional view taken substantially on the line 4—4 of Figure 3;

Figure 5 is an enlarged fragmentary isometric view showing a portion of one of the vehicle body supports.

I have shown my invention as incorporated in an automotive truck incorporating the novel construction of my invention, but it is to be understood that I contemplate the use of my invention in any place where the same may be found applicable as, for example, gondolas, railway mine cars, tanks and the like.

Referring to the drawings, the vehicle with which I have shown my invention comprises substantially a chassis 5 supported by wheels 6 and provided at its forward end with an engine (not shown) enclosed within a hood 7 and a driver's cab or compartment 8. The vehicle body of my invention is primarily supported upon longitudinally extending I-beams 10 which are suitably pivoted at the rear of the truck upon brackets 12 carried by the chassis 5. The truck body of the character shown is of the "dumping" type in which the truck body pivots around the shaft 11 journalled in the brackets 12, the actuating mechanism (not shown) for elevating the truck being suitably concealed beneath the body.

The body construction per se of my invention comprises sheet metal sides 15 and bottom 16 which are welded or riveted together at the seams as shown at 17 forming a substantially rectangular box-like structure. The sheet metal structure is suitably supported by a plurality of transversely extending I-beams 19. In order to form a simple and effective side or lateral support for the truck body, I have removed a portion of the lower flanges 20 of the I-beams 19 as at 22, the ends of the beam being bent up as particularly shown in Figures 2 and 5 at 24 to form a suitable frame structure for the body. By this means I am enabled to build a body support from standard I-beams by modifying them in accordance with the disclosure of Figures 2 and 5 of the drawings. The side members 24 may be secured to the sheet metal sides 15 by any suitable means as, for example, rivets 26.

I have provided a novel closure or end gate construction for the truck body which comprises a strip of sheet metal 30, the same being suitably reinforced by means of an iron strip of angle cross section 31. The end gate is suitably pivoted to the body structure by means of hinges 33 connected to brackets 34 by means of pivot pins 35, the latter held in place by means of cotter keys 37, the brackets being secured to an angle iron 36 formed around the periphery of the body. Obviously the end gate may be easily removed by taking out the keys 37 and withdrawing the pivot pins 35.

The several features of my invention embrace a novel means for sealing the end gate construction when in closed position to prevent any leakage of the truck body which will now be described. Referring particularly to Figure 4, that portion of the truck body adjacent the end gate is bordered with a metal bar 38 which is suitably secured to an angle iron 40 by means of rivets 41, the angle iron 40 in turn being riveted as at 43 or otherwise secured to the truck body. The surface of the bar 38 adjacent the end gate is provided with a rabbet groove 45 which is suitably lined with a sealing gasket 46 of semi-annular cross section which may be of any suitable material as, for example, rubber, soft metal, cork and the like. The end gate 29 is provided with a beading 47 suitably secured thereto as by means of rivets 48 or other suitable means, this beading 47 being adapted to engage the semi-annular sealing gasket 46 when the end gate is in closed position as particularly shown in Figure 4, and effectively serves to prevent any leakage.

Moreover it is to be noted that when the end gate is swung open during unloading operations, the sealing gasket 46 is effectively out of the way of the flow of material whether liquid or solid so that the gasket will never become damaged in this manner. A construction of this type permits the use of the truck body of my invention for hauling not only solid materials, but also fluid materials without any danger of the sealing gasket becoming damaged.

Dual means are provided for securing the end gate in closed position. One of these means is particularly shown in Figures 1 and 3 wherein a catch 50 is adapted for engagement with the end gate, the catch having a tapered portion 51 passing through an opening in an I-beam support 53 similar in construction to the I-beam supports 19, the bracket 50 being connected by means of a rod 55 to a bell crank lever 56 pivoted to the truck body as at 57 and provided with a control handle 58 adapted to be operated from the forward end of the truck body. It will be obvious from examination of Figures 1 and 3 that a counter clockwise movement of the handle 58 causes the rod 55 to move toward the right, thus moving the catch 50 outwardly and downwardly from engagement with the end gate so that the latter may swing outwardly for unloading material. The catch 50 is moved downwardly by means of the tapered portion 51 thereof moving through the opening 52 in the member 53

The other means for securing the end gate in position, in event very heavy materials are carried in the truck body, comprises a plurality of eye-bolts 60 pivoted as at 61 to brackets 62 secured to the truck body by rivets 43 or other suitable means. The end gate construction 29, the bar 38 and angle iron 40 are provided with a plurality of aligned slots 64 adapted to accommodate the eye-bolts 60, each eye-bolt being provided with a wing nut 65 adapted for engagement with the angle iron 31 of the end gate to hold the latter securely in closed position as shown in Figure 4. In event it is desired to use the catch 50 to hold the end gate, which is particularly desirable on comparatively short hauls, the wing nuts 65 may be loosened and the eye-bolts 60 swung to a position indicated in dotted lines in Figure 4 into slots 66 in the member 53, the wing nuts 65 being then drawn up into engagement with the member 53, thus serving to hold the eye-bolts out of effective use.

It is apparent that, within the scope of the invention modifications and different arrangements may be made other than is herein disclosed, and the present disclosure is illustrative merely, the invention comprehending all variations thereof.

What I claim is:

1. In a device of the character disclosed, a vehicle receptacle for transporting materials having an open end; of a closure for said open end formed of sheet metal; a member surrounding the open end of said receptacle and positioned exteriorly of said receptacle; a recess in said member; a sealing gasket in said recess and means including a beading formed on said closure and engageable with said gasket for forming a fluid tight joint; and means including a plurality of eye-bolts for securing said closure in engagement with said receptacle, said eye-bolts being adapted to be retained in a position out of use.

2. In a device of the character disclosed, a truck body for transporting materials having an open end; a closure for said open end formed of sheet metal; a member surrounding the open end of said body and positioned exteriorly thereof; a recess in said member; a sealing gasket in said recess and means including a beading carried by said closure and engageable with said gasket for forming a sealed joint; means including a plurality of eye-bolts for securing said closure in engagement with said body and means formed on said truck body and adapted to be engaged by said eye-bolts for retaining the latter in a position out of use.

3. A truck body construction comprising a substantially rectangular sheet metal receptacle having an open end; of a closure for said open end formed of sheet metal and pivoted adjacent the upper portion of said receptacle; a member surrounding the open end of said receptacle and positioned exteriorly thereof; a channel in said member of substantially semi-circular form; a sealing gasket fixed in said channel; a bar of substantially semi-circular cross-section carried by said closure; a plurality of rivets securing said bar to said closure, said bar adapted to engage said gasket to form a joint; a longitudinally movable catch for retaining the closure in engagement with the receptacle; and means including manually operated lever mechanism for securing said closure in engagement with said receptacle.

4. A truck body construction comprising a substantially rectangular sheet metal receptacle having an open end; a closure for said open end formed of sheet metal and pivoted adjacent the upper portion of said receptacle; a member surrounding the open end of said receptacle and positioned exteriorly thereof; a channel in said member of substantially semi-circular form; a sealing gasket fixed in said channel; a bar of substantially semi-circular cross-section carried by said closure; a plurality of rivets securing said bar to said closure; said bar adapted to engage said gasket to form a joint; means including a plurality of eye-bolts for securing said closure in engagement with said receptacle; a slotted flange formed upon the exterior wall of said receptacle; said eye-bolts being capable of movement into engagement with the slots in said flange whereby said eye-bolts may be retained in a position out of use.

In testimony whereof, I affix my signature.

ELWIN H. REEVES.